US010348502B2

(12) United States Patent
Bowman et al.

(10) Patent No.: US 10,348,502 B2
(45) Date of Patent: Jul. 9, 2019

(54) ENCRYPTING AND DECRYPTING DATA ON AN ELECTRONIC DEVICE

(71) Applicants: BlackBerry Limited, Waterloo (CA); 2236008 Ontario Inc., Waterloo (CA)

(72) Inventors: Roger Paul Bowman, Kitchener (CA); Dmitri Pechkin, North York (CA); David Hughston Rodrigue Sarrazin, Ottawa (CA); Timothy Lee Segato, Mississauga (CA)

(73) Assignees: BlackBerry Limited, Waterloo, Ontario (CA); 2236008 ONTARIO INC., Waterloo, Ontario (CA)

( * ) Notice: Subject to any disclaimer, the term of this patent is extended or adjusted under 35 U.S.C. 154(b) by 173 days.

(21) Appl. No.: 15/255,921

(22) Filed: Sep. 2, 2016

(65) Prior Publication Data
US 2018/0069695 A1    Mar. 8, 2018

(51) Int. Cl.
*H04L 9/14*    (2006.01)
*H04L 9/06*    (2006.01)
(Continued)

(52) U.S. Cl.
CPC ............. *H04L 9/14* (2013.01); *H04L 9/0631* (2013.01); *H04L 9/0841* (2013.01);
(Continued)

(58) Field of Classification Search
CPC ........................................................ H04L 9/14
See application file for complete search history.

(56) References Cited

U.S. PATENT DOCUMENTS 5,144,665 A * 9/1992 Takaragi ............... H04L 9/0838
380/279
5,537,474 A * 7/1996 Brown .................. H04M 3/382
380/248
(Continued)

FOREIGN PATENT DOCUMENTS

AU    2007216818    10/2007
EP    1595381    11/2005
(Continued)

OTHER PUBLICATIONS

Chang et al.; A new multi-stage secret sharing scheme using one-way function; Published in: Newsletter ACM SIGOPS Operating Systems Review; vol. 39 Issue 1, Jan. 2005; pp. 48-55; ACM Digital Library (Year: 2005).*

(Continued)

*Primary Examiner* — Bradley W Holder
(74) *Attorney, Agent, or Firm* — Fish & Richardson P.C.

(57) ABSTRACT

Systems, methods, and software can be used to encrypt and decrypt data. In some aspects, a first primary secret key based on a primary ephemeral key pair and a primary master public key is generated by a primary data service application on an electronic device. A first primary ciphertext is generated by encrypting a first portion of the data using the first primary secret key. A second primary secret key is generated based on the first primary secret key. The first primary secret key is deleted. The first primary ciphertext is sent from the primary data service application to a secondary data service application. A first encrypted text is received from the secondary data service application. The first encrypted text is generated by encrypting the first primary ciphertext.

20 Claims, 6 Drawing Sheets

(51) Int. Cl.
*H04L 9/08* (2006.01)
*H04L 9/16* (2006.01)

(52) U.S. Cl.
CPC .......... *H04L 9/0861* (2013.01); *H04L 9/0891* (2013.01); *H04L 9/16* (2013.01); *H04L 2209/24* (2013.01)

(56) References Cited

U.S. PATENT DOCUMENTS

| | | | |
|---|---|---|---|
| 6,069,952 A * | 5/2000 | Saito | G06F 21/10 348/E7.056 |
| 6,963,971 B1 | 11/2005 | Bush et al. | |
| 7,903,820 B2 | 3/2011 | Waisbard | |
| 8,078,869 B2 | 12/2011 | Adams et al. | |
| 8,386,778 B2 | 2/2013 | Adams et al. | |
| 9,154,469 B2 | 10/2015 | Adams et al. | |
| 9,178,699 B2 | 11/2015 | Lambert et al. | |
| 9,342,699 B2 | 5/2016 | Bowman et al. | |
| 2005/0235148 A1 | 10/2005 | Scheidt et al. | |
| 2006/0253396 A1 | 11/2006 | Ohkawa | |
| 2006/0265595 A1 | 11/2006 | Scottodiluzio | |
| 2007/0033392 A1 | 2/2007 | Ganesan et al. | |
| 2007/0101133 A1 | 5/2007 | Liu et al. | |
| 2007/0165844 A1 | 7/2007 | Little | |
| 2008/0219451 A1 * | 9/2008 | Ju | G06F 21/10 380/282 |
| 2010/0153728 A1 | 6/2010 | Brown | |
| 2011/0138192 A1 * | 6/2011 | Kocher | G06F 21/602 713/189 |
| 2011/0208970 A1 | 8/2011 | Brown et al. | |
| 2011/0270748 A1 | 11/2011 | Graham et al. | |
| 2011/0307706 A1 | 12/2011 | Fielder | |
| 2012/0300925 A1 | 11/2012 | Zaverucha et al. | |
| 2013/0019096 A1 | 1/2013 | Palzer et al. | |
| 2013/0145160 A1 | 6/2013 | Bursell | |
| 2013/0287207 A1 | 10/2013 | Zaverucha et al. | |
| 2013/0290712 A1 | 10/2013 | Zaverucha et al. | |
| 2013/0290713 A1 | 10/2013 | Zaverucha et al. | |
| 2015/0003615 A1 | 1/2015 | Vanstone et al. | |
| 2015/0124961 A1 | 5/2015 | Lambert et al. | |
| 2015/0127952 A1 | 5/2015 | Bowman et al. | |
| 2015/0163056 A1 | 6/2015 | Nix | |
| 2016/0352706 A1 * | 12/2016 | Peeters | H04L 9/0861 |

FOREIGN PATENT DOCUMENTS

| | | |
|---|---|---|
| EP | 1734723 | 12/2006 |
| EP | 2871798 | 5/2015 |
| EP | 2874151 | 5/2015 |
| EP | 3099003 | 11/2016 |
| IN | 3754/DELNP/2005 | 9/2009 |
| JP | 2010-104018 | 5/2010 |
| KR | 100716529 | 5/2007 |

OTHER PUBLICATIONS

Rifai et al.; An Algorithmic Approach to Securing the Three-Stage Quantum Cryptography Protocol; Published in: 2013 12th IEEE International Conference on Trust, Security and Privacy in Computing and Communications; Date of Conference: Jul. 16-18, 2013; IEEE Xplore (Year: 2013).*
Announcing the Advanced Encryption Standard (AES); Federal Information Processing Standards Publication 197; Nov. 26, 2001; 51 pages.
Menezes et al.; Chapter 7—"Block Ciphers," Handbook of Applied Cryptography, CRC Press 1996, 61 pages.
Menezes et al.; Chapter 8—"Public Key Encryption," Handbook of Applied Cryptography, CRC Press 1996, 38 pages.
Menezes et al.; Chapter 12—"Key Establishment Protocols," Handbook of Applied Cryptography, CRC Press 1996, 54 pages.
Zigbee Specification; Table of Contents; Chapter 4—Security Services Specification, Zigbee Document 053474r20, Sep. 7, 2012, 118 pages.
NiAP; "Protection Profile for Mobile Device Fundamentals"; Version 2.0; Sep. 17, 2014; 175 pages.
European Search Report in European Application No. 14191527.2, dated Apr. 7, 2015, 8 pages.
Extended European Search Report in European Application No. 17187485.2, dated Jan. 26, 2018, 9 pages.
Extended European Search Report in European Application No. 17187477.9, dated Jan. 26, 2018, 8 pages.
Menezes et al., "Chapter 13: Key Management Techniques," Handbook of Applied Cryptography, CRC Press 1996; pp. 543-590.
Communication Pursuant to Article 94(3) EPC issued in European Application No. 14191527.2 dated Oct. 30, 2017; 8 pages.
Certicom Research, "SEC 1: Elliptic Curve Cryptography," Standards for Efficient Cryptography, May 21, 2009; Version 2.0.
Communication Pursuant to Article 94(3) EPC issued in European Application No. 14191527.2 dated Mar. 21, 2017.
United States Office Action issued in U.S. Appl. No. 15/255,960 dated May 3, 2018, 20 pages.

\* cited by examiner

ENCRYPTING AND DECRYPTING DATA ON AN ELECTRONIC DEVICE

CROSS-REFERENCE TO RELATED APPLICATIONS

This application is a co-pending application of U.S. application Ser. No. 15/255,960, filed on Sep. 2, 2016 entitled "DECRYPTING ENCRYPTED DATA ON AN ELECTRONIC DEVICE"; the contents of which are incorporated herein by reference.

TECHNICAL FIELD

The present disclosure relates to encrypting and decrypting data on an electronic device.

BACKGROUND

In some cases, electronic devices, including mobile devices or other computer systems, can use public-key encryption algorithms to secure data on the electronic devices. The public-key encryption algorithms include hybrid symmetric/asymmetric schemes. Some enterprises and standards bodies have specified security standards or policies for the treatment of files while an electronic device is locked. For example, the National Information Assurance Partnership (NIAP) requires that data be encrypted with public-key cryptography and that, once the data is encrypted, the encrypted data not be decryptable until the private key holder returns.

DESCRIPTION OF DRAWINGS

Like reference numbers and designations in the various drawings indicate like elements.

DETAILED DESCRIPTION

Figure 1:
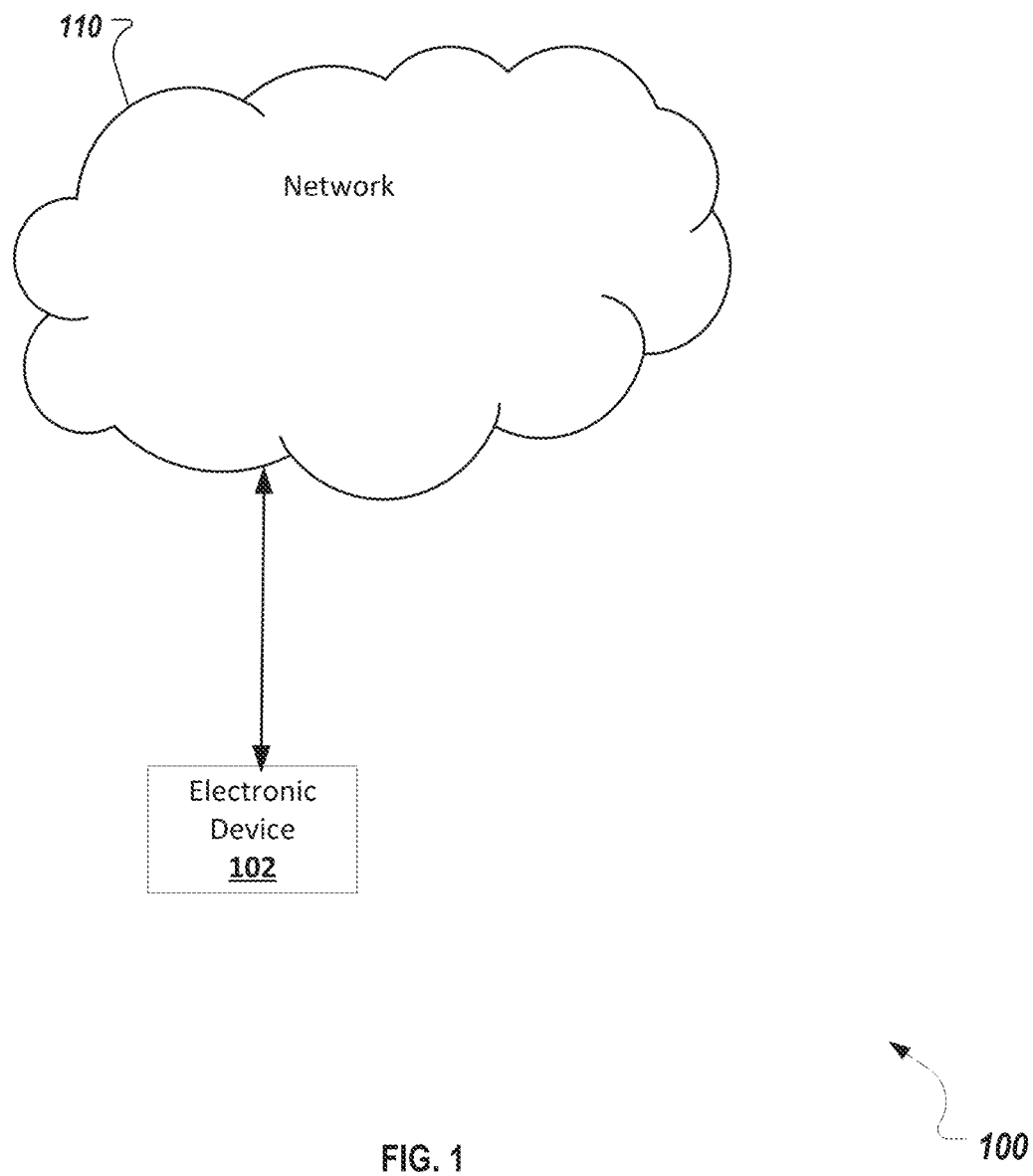
FIG. 1 is an example communication system that encrypts and decrypts data according to an implementation.

An electronic device can receive data from a network. Applications on the electronic device can also generate data. In some cases, the electronic device or a partition of the electronic device can be in a locked state while the electronic device continues to receive or generate data. In some cases, an electronic device can be considered to be in a locked state when the device is powered on but most functionalities are unavailable for a user to use. If user authentication is configured, user authentication may be required to access these functionalities when the device is in the locked state. If the user authentication succeeds, the device can transition to an unlocked state. The device can be considered to be in an unlocked state when the device is powered on and the device functionalities are available for the user to use.

The electronic device can encrypt the data received or generated during the locked state and store the encrypted data in a secured storage on the electronic device. The encrypted data cannot be decrypted by entities other than the holder of a master private key that is associated with a public key used to encrypt the data. The master private key can be associated with the electronic device, or an application on the electronic device that encrypts the data.

Some public-key encryption algorithms, e.g., RSA Public-Key Cryptography Standards (PKCS) #1 Encryption Scheme or Elliptic Curve Integrated Encryption Scheme (ECIES), encrypt small amounts of data and use hybrid asymmetric/symmetric schemes. In such instances, the symmetric key is encrypted by a public key, and the symmetric key is used to encrypt the data. When the stream of data is large, or arrives in pieces spread out in time, the hybrid scheme will hold the symmetric key during the encryption process, and the key to decrypt the ciphertext remains available. In some instances, the symmetric key remains in the memory of an electronic device during a locked state, and therefore the data can be decrypted by other entities that access the key in the memory.

In some implementations, data can be encrypted using a series of secret keys, where the first secret key in the series of secret keys can be derived from a shared secret that is deleted after the first secret key is generated. Each secret key in the series can be used to encrypt a discrete portion of the data, and each secret key can be used to generate the subsequent secret key in the series, and deleted after the subsequent secret key is generated. The shared secret can be established by a key agreement according to Diffie-Hellman or another key agreement protocol. The shared secret can be a random string, e.g., generated by a random number generator or another system, or can be derived in another manner. For example, the shared secret can be established based on a master public key associated with the electronic device. A one-way function can be used to generate the subsequent secret key based on the previous secret key. The one-way function can include a hash function, a key derivation function, a block cipher operation, or another one-way function.

During the encryption or the decryption process, the shared secret is generated. A first secret key is generated from the shared secret and each secret key is generated based on the previous secret key. The shared secret and the secret key are deleted after the next secret key is generated. Therefore, if the decryption is interrupted, for example by a lock event, when the electronic device is decrypting a current portion of the data, the electronic device will re-compute each secret key in the chaining process until the current secret key is obtained. When the current secret key is obtained, the electronic device can resume the decryption by decrypting the current portion of the data using the current secret key.

In some cases, more than one stages of encryption can be used to encrypt the data. In one example, an enterprise can configure the data associated with an enterprise application on the electronic device to be encrypted using a specific encryption application in addition to a default encryption performed on the electronic device. In another example, an enterprise can configure the data to be encrypted by the same application multiple times using different keys for additional protection. Each of the multiple encryption applications can generate, manage, or control its own keys and algorithms used in the encryption process.

In some implementations, multiple data service applications can be used to encrypt or decrypt a portion of data. Each of the data service applications can generate its own ephemeral key pair. Each of the data service application can generate its own shared secret and secret keys in succession based on the ephemeral key pair. The portion of data can be encrypted successively by each of the data service applications using their respective secret keys. Each of the data service applications can manage its secret keys and delete its secret keys after generating the next secret keys, without passing the secret keys among the data service applications. Using this approach, each portion of the data can be encrypted and decrypted using multiple data service applications. FIGS. 1-4 and associated descriptions provide additional details of these implementations.

FIG. 1 is an example communication system 100 that encrypts and decrypts data according to an implementation. At a high level, the example communication system 100 includes an electronic device 102 that is communicably coupled with a network 110.

The network 110 represents an application, set of applications, software, software modules, hardware, or any combinations thereof that can be configured to provide communications for the electronic device 102 with other devices connected to the network 110, e.g., an application server, an Internet service server, a security service server, other electronic devices, or any combinations thereof. The network 110 includes a wireless network, a wireline network, or a combination thereof. For example, the network 110 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), or LTE-Advanced. In some instances, the core networks may be evolved packet cores (EPCs).

A RAN is part of a wireless telecommunication system which implements a radio access technology, such as GSM, UMTS, CDMA2000, 3GPP LTE, and 3GPP LTE-A. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

Figure 2:
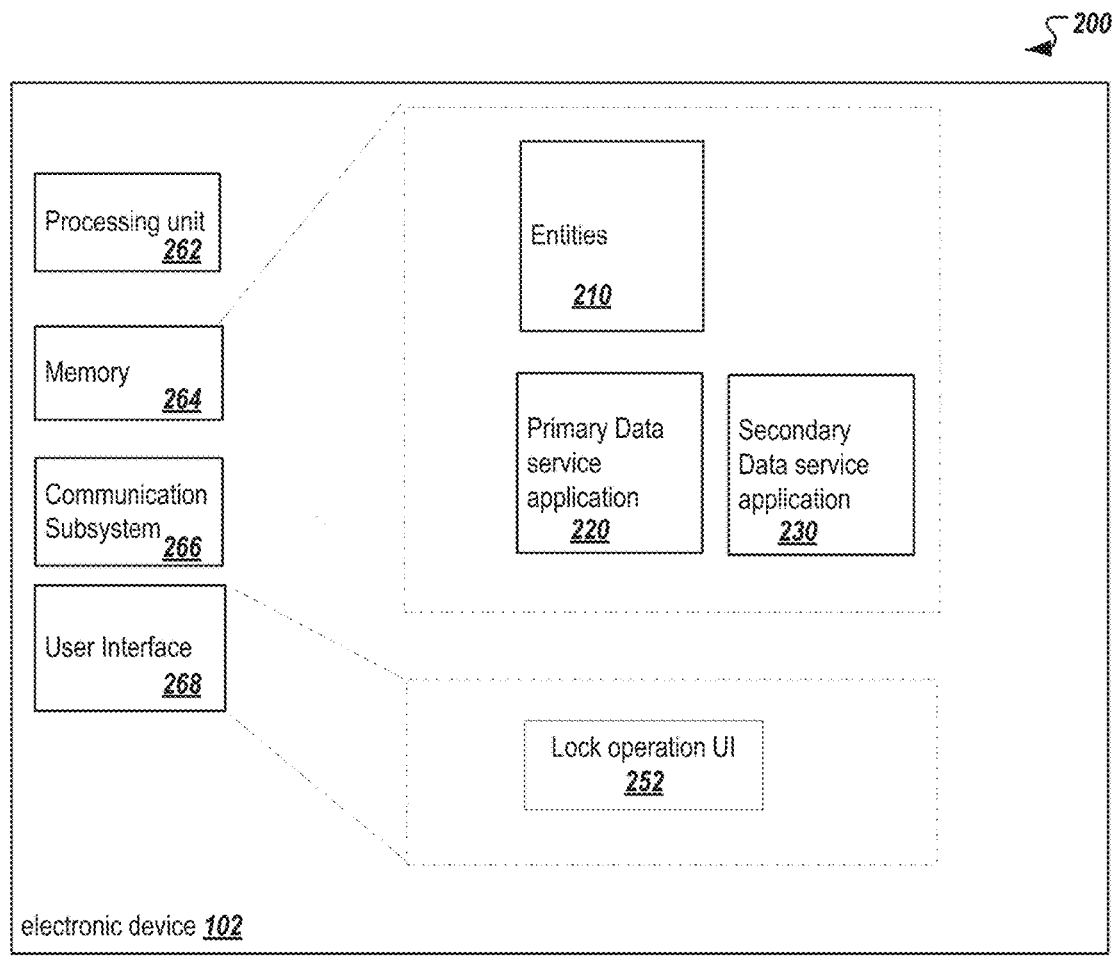
FIG. 2 is a schematic diagram showing an electronic device that encrypts and decrypts data according to an implementation.

The electronic device 102 represents an application, set of applications, software, software modules, hardware, or any combinations thereof that can be configured to encrypt or decrypt data. The electronic device 102 can receive data from the network 110, encrypt the received data, and store the encrypted data on the electronic device 102. The electronic device 102 can also retrieve encrypted data stored on the electronic device 102, decrypt the encrypted data, process the decrypted data, and send the processed data to the network 110. FIGS. 2-4 and associated descriptions provide additional details of the encryption and the decryption operations.

While elements of FIG. 1 are shown as including various component parts, portions, or modules that implement the various features and functionality, these elements may instead include a number of sub-modules, third-party services, components, libraries, and such, as appropriate. Furthermore, the features and functionality of various components can be combined into fewer components as appropriate.

FIG. 2 is a schematic diagram 200 showing the electronic device 102 that encrypts and decrypts data according to an implementation. The electronic device 102 includes a processing unit 262, a communication subsystem 266, a user interface 268, and a memory 264. An electronic device may include additional, different, or fewer features, as appropriate.

The example processing unit 262 can include one or more processing components (alternatively referred to as "processors" or "central processing units" (CPUs)) configured to execute instructions related to one or more of the processes, steps, or actions described above, in connection with one or more of the implementations disclosed herein. In some implementations, the processing unit 262 can be configured to generate control information, such as a measurement report, or respond to received information, such as control information from a network node. In some cases, the processing unit 262 can also be configured to make a radio resource management (RRM) decision, such as cell selection/reselection information, or trigger a measurement report. The processing unit 262 can also include other auxiliary components, such as random access memory (RAM) and read-only memory (ROM).

The example communication subsystem 266 can be configured to provide wireless or wireline communication for data or control information provided by the processing unit 262. The communication subsystem 266 can include, for example, one or more antennas, a receiver, a transmitter, a local oscillator, a mixer, and a digital signal processing (DSP) unit. In some implementations, the communication subsystem 266 can support multiple input multiple output (MIMO) transmissions. In some implementations, the receivers in the communication subsystem 266 can be an advanced receiver or a baseline receiver. Two receivers can be implemented with identical, similar, or different receiver processing algorithms.

The example user interface 268 can include, for example, any of the following: one or more of a display or touch screen display (for example, a liquid crystal display (LCD), a light emitting display (LED), an organic light emitting display (OLED), or a micro-electromechanical system (MEMS) display), a keyboard or keypad, a trackball, a speaker, or a microphone. As shown in FIG. 2, the example user interface 268 can be configured to present a lock operation user interface 252. The lock operation user interface 252 represents a graphic user interface that outputs one or more user interface objects for a user to lock or unlock a group of resources on the electronic device 102. The lock operation user interface 252 can receive a lock command or an unlock command based on user input. The lock operation user interface 252 can also list one or more groups of resources, or all the resources on the electronic device, for the user to select a particular group of resources to lock or unlock.

The example memory 264 can be a computer-readable storage medium on the electronic device 102. Examples of the memory 264 include volatile and non-volatile memory, magnetic media, optical media, random access memory (RAM), read-only memory (ROM), removable media, and others. The memory 264 can store an operating system (OS) of the electronic device 102 and various other computer-executable software programs for performing one or more of the processes, steps, or actions described above.

As shown in FIG. 2, the example memory 264 can include one or more entities 210. The entities 210 include programs, modules, scripts, processes, or other objects that can be configured to send an encryption request or a decryption request. For example, entities 210 can include native applications that are associated with the OS of the electronic device 102. Entities 210 can also include enterprise or personal applications that are installed on the electronic device 102. Further, while illustrated as internal to the electronic device 102, one or more processes associated with an entity may be stored, referenced, or executed remotely. For example, a portion of an entity may be an interface to a web service that is remotely executed. Moreover, an entity may be a child or sub-function of another software application.

The example memory 264 can include a primary data service application 220 and a secondary data service application 230. The data service application, e.g., the primary data service application 220 or the secondary data service application 230, represents an application, set of applications, software, software modules, hardware, or any combinations thereof, that can be configured to encrypt and decrypt data. The data service application can retrieve public or private keys associated with the entity 210. The data service application can generate shared secret, ephemeral keys, current secret keys, current encrypted secret keys, or any combinations thereof, for encryption or decryption operations. In some cases, the primary data service application 220 and the secondary data service application 230 can each perform a stage of encryption and decryption process. For example, the primary data service application 220 can receive an encryption request from an entity 210, perform a first stage of encryption to generate the primary ciphertext, send the primary ciphertext data to the secondary data service application 230 for a second stage of encryption, and receive the encrypted data from the secondary data service application 230. The primary data service application 220 can also receive a decryption request from an entity 210, send the encrypted data to the secondary data service application 230 for a first stage of decryption, receive the secondary ciphertext from the secondary data service application 230, and perform a second stage of decryption to generate decrypted data. FIGS. 3-4 and associated descriptions provide additional details of these implementations. In some cases, the secondary data service application 230 can be located outside of the electronic device 102, for example on a server that is coupled with the electronic device 102 over the network 110. In some cases, more than one secondary data service applications 230 can be used to encrypt or decrypt the data.

Turning to a general description, an electronic device, e.g., the electronic device 102, may include, without limitation, any of the following: computing device, mobile device, mobile electronic device, user device, mobile station, sub scriber station, portable electronic device, mobile communications device, wireless modem, wireless terminal, television, printer or other peripheral, vehicle, or any other electronic device capable of sending and receiving data. Examples of a mobile device may include, without limitation, a cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

Figure 3A:
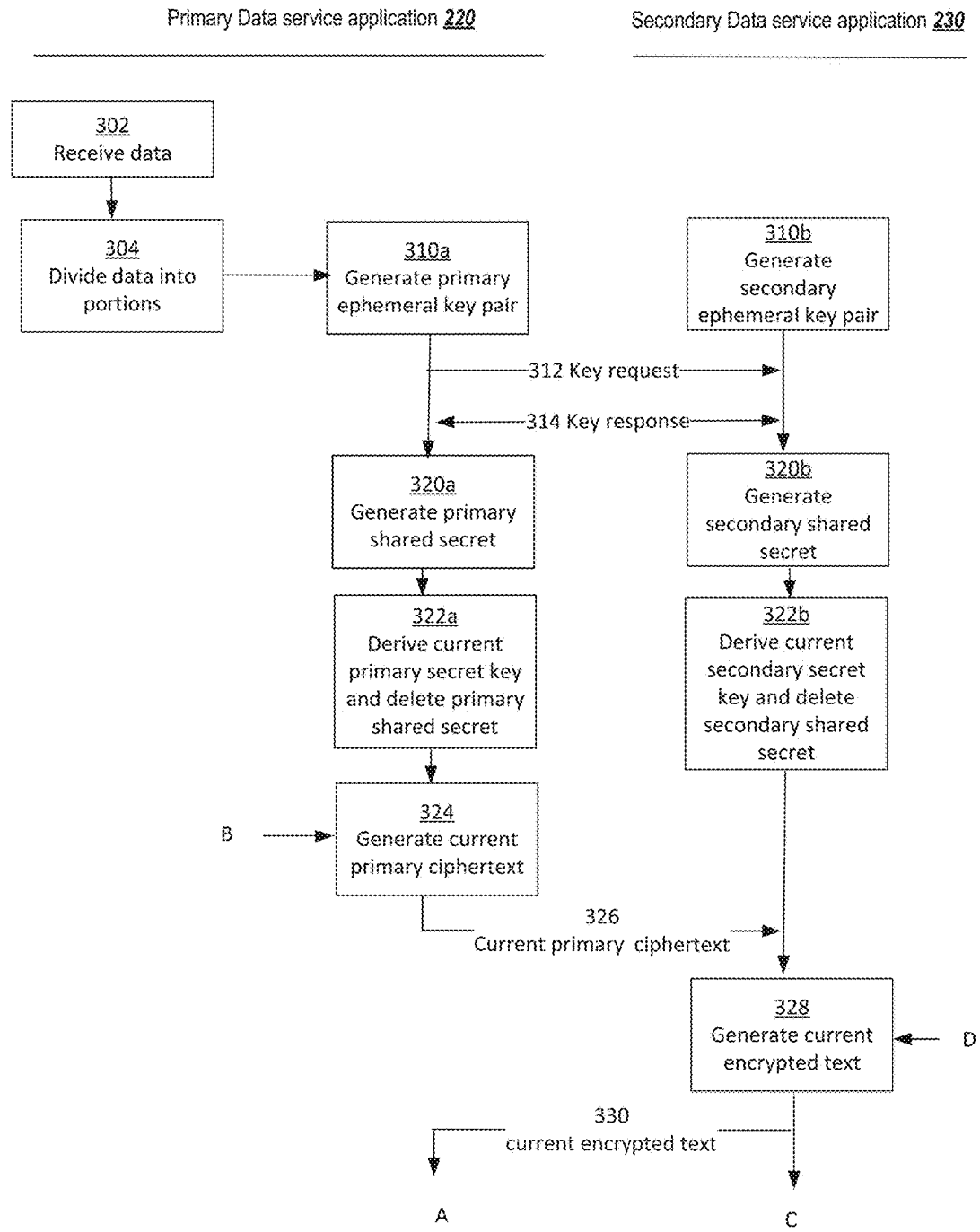
FIGS. 3A and 3B are flow diagrams showing an example process for encrypting data according to an implementation.
Figure 3B:
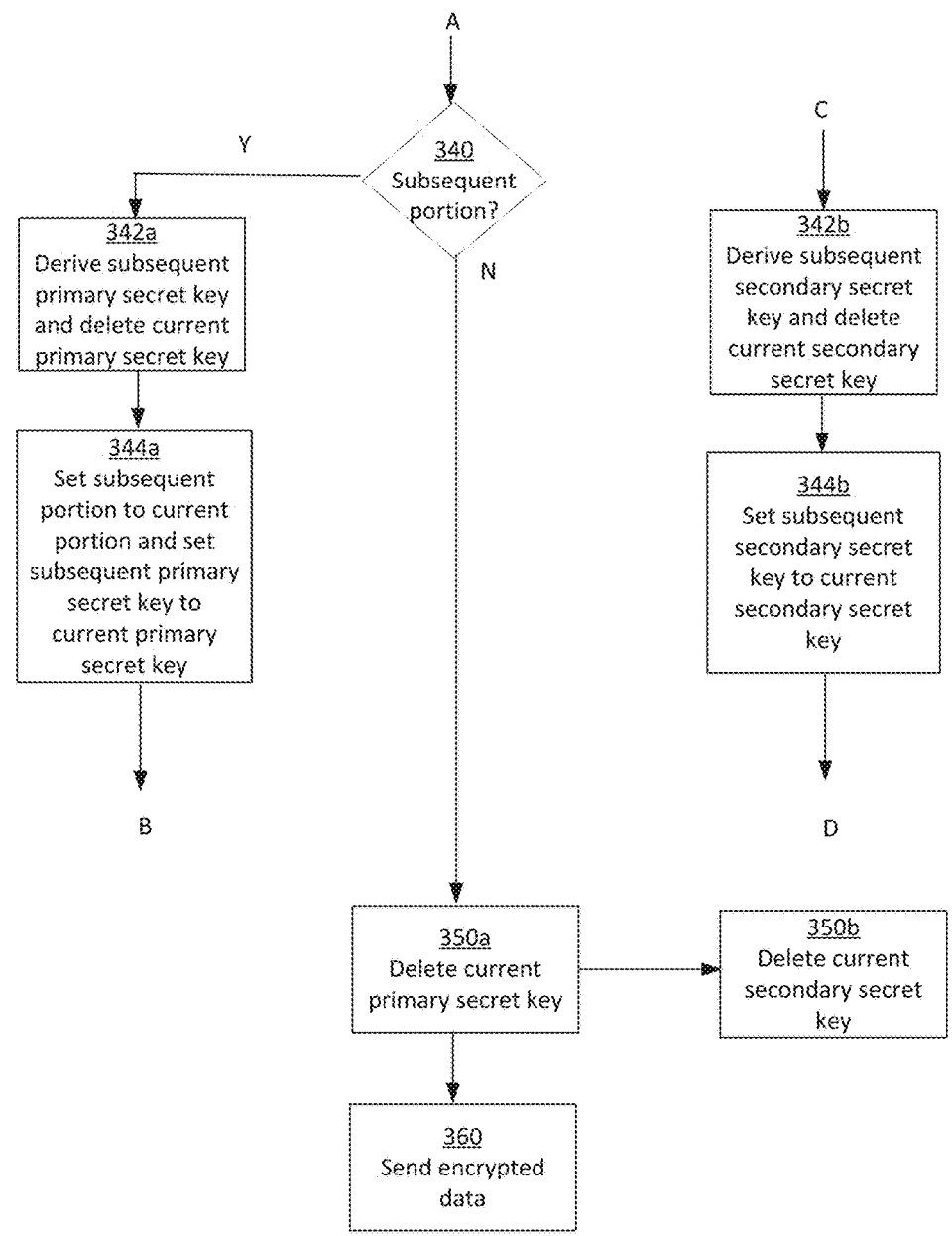

FIG. 3 (including FIGS. 3A and 3B) is a flow diagram showing an example process 300 for encrypting data according to an implementation. The process 300 can be implemented by an electronic device, e.g., the electronic device 102 shown in FIG. 1. The process 300 shown in FIG. 3 can also be implemented using additional, fewer, or different entities. Furthermore, the process 300 shown in FIG. 3 can also be implemented using additional, fewer, or different operations, which can be performed in the order shown or in a different order. In some instances, an operation or a group of the operations can be iterated or repeated, for example, for a specified number of iterations or until a terminating condition is reached.

The example process 300 begins at 302, where data to be encrypted is received. The data can be any type of data, e.g., a message received over a network or a file stored on the electronic device. The format of the data can be plaintext, image, audio, video, or any other format. The process described herein can be used for encrypting and decrypting any form of data. For example, the data could be a message such as a plaintext message or a media message. In some implementations, an application, e.g., an enterprise application or a third-party application, on the electronic device can initiate a request to encrypt the data. In some cases, the request to encrypt the data can indicate that the encryption is to be performed by both the primary data service application 220 and the secondary data service application 230.

At 304, the data is divided into working portions. For example, the working portions can be implemented as a plurality of blocks. The working portions can be the same size or different sizes. One or more working portions of the data can be padded before division or during division. In some cases, only one portion is used, e.g., when the size of the data is less than the size of one portion and thus the data is not divided. In some instances, the division of the data can happen later in the encryption process, for example if the data arrives later in pieces. The first portion of the data can initially be set as the "current portion." The current iteration of the encryption process is applied to the current portion of the data.

At 310a, a primary ephemeral key pair is generated by the primary data service application 220. The primary ephemeral key pair can include a primary ephemeral public key and a primary ephemeral private key. In some cases, the primary ephemeral key pair can be referred to as the primary anchor point key pair. In some cases, the primary ephemeral key pair can be an ECC key pair, an RSA key pair, or another type of key pair. In some implementations, the primary ephemeral public key is saved for output with the final encrypted data. In some cases, the primary ephemeral key pair is generated based on an entropy source using one or more cryptographic algorithms. Examples of the cryptographic algorithms that can be used to generate the primary ephemeral key pair includes the Elliptic Curve Cryptography (ECC) key pair generation algorithms, e.g., secp521r1 curve.

At 310b, a secondary ephemeral key pair is generated by the secondary data service application 230. The secondary ephemeral key pair can include a secondary ephemeral public key and a secondary ephemeral private key. In some cases, the secondary ephemeral key pair can be referred to as the secondary anchor point key pair. The secondary data service application 230 can use the same or different cryptographic algorithms as the primary data service application 220 in generating the secondary ephemeral key pair. The secondary ephemeral key pair can be different than the first ephemeral key pair.

In some cases, the generation of the secondary ephemeral key pair can be triggered by a command. For example, after receiving data to encrypt at 302, the primary data service application 220 sends a command to the secondary data service application 230 to initiate the generation of the secondary ephemeral key pair. Alternatively or additionally, the generation of the secondary ephemeral key pair can be triggered by a key request discussed at step 312.

At 312, the primary data service application 220 sends a key request to the secondary data service application 230. In response, at 314, the secondary data service application 230 sends the secondary ephemeral public key to the primary data service application 220. The secondary ephemeral public key can be outputted with the primary ephemeral public key and the final encrypted data.

At 320a, a primary shared secret is generated. The primary shared secret can be generated based on a primary master public key and the primary ephemeral private key. The primary master public key can be part of a key pair that is associated with the primary data service application. In an asymmetrical cryptography scheme, the key pair can include the primary master public key and an associated primary master private key. In some cases, the primary master public key and the primary master private key can be generated in an Elliptic Curve Cryptographic (ECC) scheme, an RSA cryptographic scheme, or another type of scheme. In some cases, there is one primary master key pair associated with the primary data service application. Alternatively or additionally, the primary data service application can be associated with more than one primary master key pairs, and each primary master key pair is associated with one or more applications that can send encryption requests. In these cases, the primary master key pair that is associated with the application that requests to encrypt the data can be used in generating the primary shared secret.

The primary shared secret can be generated using the primary master public key and the primary ephemeral private key according to an Elliptic Curve Diffie-Hellman (ECDH) technique or another algorithm. An ECDH scheme is an asymmetrical cryptographic scheme using a public-private key pair as in a Diffie-Hellman scheme. The ECDH scheme uses elliptic curve cryptography to provide the key pair and the primary shared secret.

The primary ephemeral private key can be deleted after the shared secret has been generated. Generally, data can be discarded or deleted in a number of different ways. For example, data can be discarded by removing or deleting a pointer to the data, by setting the corresponding bits in memory to zero or some other default values, by overwriting the data one or more times, by randomizing the values of the corresponding bits in memory, or by another technique. Each of the keys discussed in this disclosure can be deleted by these or other techniques.

In some implementations, the primary shared secret can be generated and shared in another manner. For example, an initial secret can be generated as a random string. The initial secret can be transported, for example, by encrypting it to the public key of the entity. The public-key encrypted secret can be provided as the primary shared secret.

At 322a, a current primary secret key is generated based on the primary shared secret. In some implementations, a hash, a key derivation function (KDF), or any other cryptographic one-way function can be applied to the primary shared secret to derive the current primary secret key. For example, a one-way function such as the National Institute of Standards and Technology (NIST) KDF Alternative 1 using SHA-512, can be used to generate the current primary secret key. In some cases, a one-way function can be represented as a function $f$. For each x in the domain of $f$, it can be easy to compute $f(x)$; but for substantially all y in the range of $f$, it can be difficult to find any x such that $f(x)=y$.

The current primary secret key can be used to encrypt the current portion of the data. The current primary secret key can be an Advanced Encryption Standard (AES) key. In some cases, other current primary cryptographic parameters for the primary data service application 220, e.g., a current primary initialization vector (IV), can also be generated based on the primary shared secret using a hash, a KDF, or any other cryptographic one-way function.

After generating the current primary secret key, the primary shared secret is deleted. Deleting the primary shared secret can prevent the encrypted data from being decrypted by entities other than the private key holder. For example, when the electronic device is locked, other entities on the electronic device cannot retrieve the primary shared secret from the memory and use the primary shared secret to generate decryption keys to decrypt the encrypted data.

At 324, the current portion of data is encrypted using the current primary secret key to generate a current primary ciphertext. In some cases, other current primary cryptographic parameters, e.g., the current primary IV, can also be used in the encryption process. The encryption can be performed using an AES-256 block cipher in a chained-block cipher (CBC) mode. The AES-256 uses a 256-bit key for encryption. In the CBC mode, each block of the data is XORed with the previous encrypted block before being encrypted itself. Therefore, the encryption of each block depends on all previously encrypted blocks.

At 326, the current primary ciphertext is sent to the secondary data service application 230 to perform a secondary encryption. In some cases, the secondary data service application 230 can use a key-chain process similar to the primary data service application 220 described previously to generate the current secondary secret key that is used for the secondary encryption. For example, at 320b, the secondary data service application 230 can generate a secondary shared secret based on a secondary master public key and the secondary ephemeral private key. The secondary master public key can be part of a key pair of that is associated with the secondary data service application. The key pair can include the secondary master public key and an associated secondary master private key. At 322b, the secondary data service application 230 can use a cryptographic one-way function, e.g., a hash or a key derivation function (KDF), to derive a current secondary secret key based on the secondary shared secret. The secondary data service application 230 can also generate a current secondary IV or other current secondary encryption information from the secondary shared secret. Alternatively or additionally, the secondary data service application 230 can use a different encryption algorithms to generate the current secondary secret key used for the secondary encryption.

At 328, the secondary data service application 230 performs the secondary encryption. The current primary ciphertext is encrypted with the current secondary secret key and the current secondary IV to generate a current encrypted text. The encryption can be performed using an AES-256 block cipher in a chained-block cipher (CBC) mode or any other encryption algorithms. At 330, the current encrypted text is sent to the primary data service application 220.

At 340, whether the current working portion is the last portion of the data is determined. If the current working portion is not the last portion of the data, subsequent portions can be encrypted as part of an iterative process. At 342a, a subsequent primary secret key, subsequent primary IV, and other primary encryption information can be generated for the subsequent data portion. The subsequent primary secret key and the subsequent primary IV can be generated based on the current primary secret key and the current primary IV. For example, using the current primary secret key and the current primary IV as input, a KDF can be applied to generate the subsequent primary secret key and subsequent primary IV.

After the subsequent primary secret key and the subsequent primary IV are generated, the current primary secret key and the current primary IV are deleted.

At 344a, the subsequent portion of the data is set to be the current portion, the subsequent primary secret key is set to be the current primary secret key, and the subsequent primary IV is set to be the current primary IV.

Similarly, after generating the current encrypted text at 328, the secondary data service application 230 can proceed to 342b and generate the subsequent secondary secret key and the subsequent secondary IV based on the current secondary secret key and the current secondary IV. The secondary data service application 230 can delete the current secondary secret key and the current secondary IV. At 344b, the secondary data service application 230 can set the subsequent secondary secret key to be the current secondary secret key, and the subsequent secondary IV to be the current secondary IV. The primary and the secondary encryption can be performed as described previously, i.e., at 324, 326, 328, and 320.

If the current working portion is the last portion of the data, at 350a, the current primary secret key and the current primary cryptographic parameters can be deleted. Similarly, at 350b, the current secondary secret key and the current secondary cryptographic parameters can be deleted. In some cases, the primary data service application 220 can send a command to the secondary data service application 230 to instruct the secondary data service application 230 to delete the current secondary secret key and the current secondary cryptographic parameters. Alternatively, the current secret keys and other cryptographic parameters for the primary and the secondary data service applications can be saved for future encryption process. In one example, an application can initiate a first request to encrypt a first segment of data at 302. After the first segment of data is encrypted and written into a file. The application can initiate a second request to encrypt a second segment of data to be written into the same file. The saved secret keys and cryptographic parameters can be retrieved to generate the next secret keys and cryptographic parameters for encryption, instead of regenerating the ephemeral key pair and shared secret and using the regenerated ephemeral key pair and shared secret to derive the current secret keys and cryptographic parameters.

At 360, the encrypted data can be sent to the entity requesting the encryption. The encrypted data can include one or more portions of the encrypted texts. The primary and the secondary ephemeral public keys can also be sent with the encrypted data. In some cases, the primary and the secondary ephemeral public keys can be stored with the encrypted data.

In some cases, the key-chaining process described previously can also be used to generate authentication information. For example, a current primary authentication key, e.g., a current Message Authentication Code (MAC) key, can be generated based on the primary shared secret. A data integrity algorithm, can be applied to the current portion of encrypted text to generate a HMAC tag for the current portion. An example of the data integrity algorithm is a keyed-hash message authentication code (HMAC) algorithm, e.g., the HMAC-SHA-256 algorithm. The data integrity algorithm can use the current primary authentication key, the current primary IV, or a combination thereof to generate the HMAC tag for the current portion. The current primary authentication key can be used to generate a subsequent primary authentication key and the current primary authentication key can be deleted after the subsequent primary authentication key is deleted. The subsequent primary authentication key can be applied on the subsequent portion of encrypted text to generate the HMAC tag for the subsequent portion. The HMAC tag for each portion can be sent to the entity requesting the encryption. The HMAC tags can be used to authenticate the encrypted data during the decryption process. Alternatively or additionally, the secondary data service application 230 can generate the secondary authentication key for each portion and generate the HMAC tag for each portion. The secondary data service application 230 can send the HMAC tags to the primary data service application 220.

In some implementations, an ephemeral key interval can be configured. A new ephemeral key pair can be generated for each ephemeral key interval. In one example, the ephemeral key interval can be set to a number of bytes. For each iteration of the current working portion, the data to be encrypted is accumulated. If the data to be encrypted reaches the configured ephemeral key interval before the last portion of the data is encrypted, the process returns to 310a and 310b, where a new primary ephemeral key pair and a new secondary ephemeral key pair are generated. The new primary and secondary shared secret, and subsequently a new current primary and secondary secret key are generated based on the new primary and secondary ephemeral key pairs. A new iteration process using the new current primary and secondary secret keys can be used to encrypt the remaining working portions of the data. In some cases, the new ephemeral primary and secondary public keys are also sent to the entity requesting the encryption and stored with the remaining encrypted data. If the remaining data exceeds the ephemeral key interval, another new ephemeral key pair can be generated when the ephemeral key generation length is reached again. The process can be repeated until the remaining data is encrypted.

Alternatively or in combination, the ephemeral key interval can be set to a number of times a current secret key is generated. A counter can be configured to keep track each time a current primary and secondary secret keys are generated. When the counter reaches the ephemeral key interval and there is remaining data to be encrypted, the new primary and secondary ephemeral key pairs can be generated and the counter can be reset to 0. Applying an ephemeral key interval can limit the number of secret keys that are chained, and speed up the decryption process.

In some cases, the generation of the new primary and secondary ephemeral key pairs can be reset by a triggering event. The triggering event can be associated with the application that requests the encryption. In one example, if the encrypted file is closed and then re-opened, new primary and secondary ephemeral key pairs can be generated and the ephemeral key interval can be reset.

In some cases, the primary data service application 220 and the secondary data service application 230 can be configured with different ephemeral key intervals. Accordingly, when the ephemeral key interval is reached at one of the data service applications, the respective data service application can generate a new ephemeral key pair. When the secondary data service application 230 generates a new secondary ephemeral key pair, the secondary data service application 230 can send the new secondary ephemeral public key to the primary data service application 220.

In some cases, more than two data service applications can be used to encrypt data. For example, after the secondary data service application performs the second stage of encryption of the current portion of data, the encrypted text can be sent to a third data service application for additional encryption. Additional stages of encryption can also be performed by the primary, the secondary, or any other data service applications.

Figure 4A:
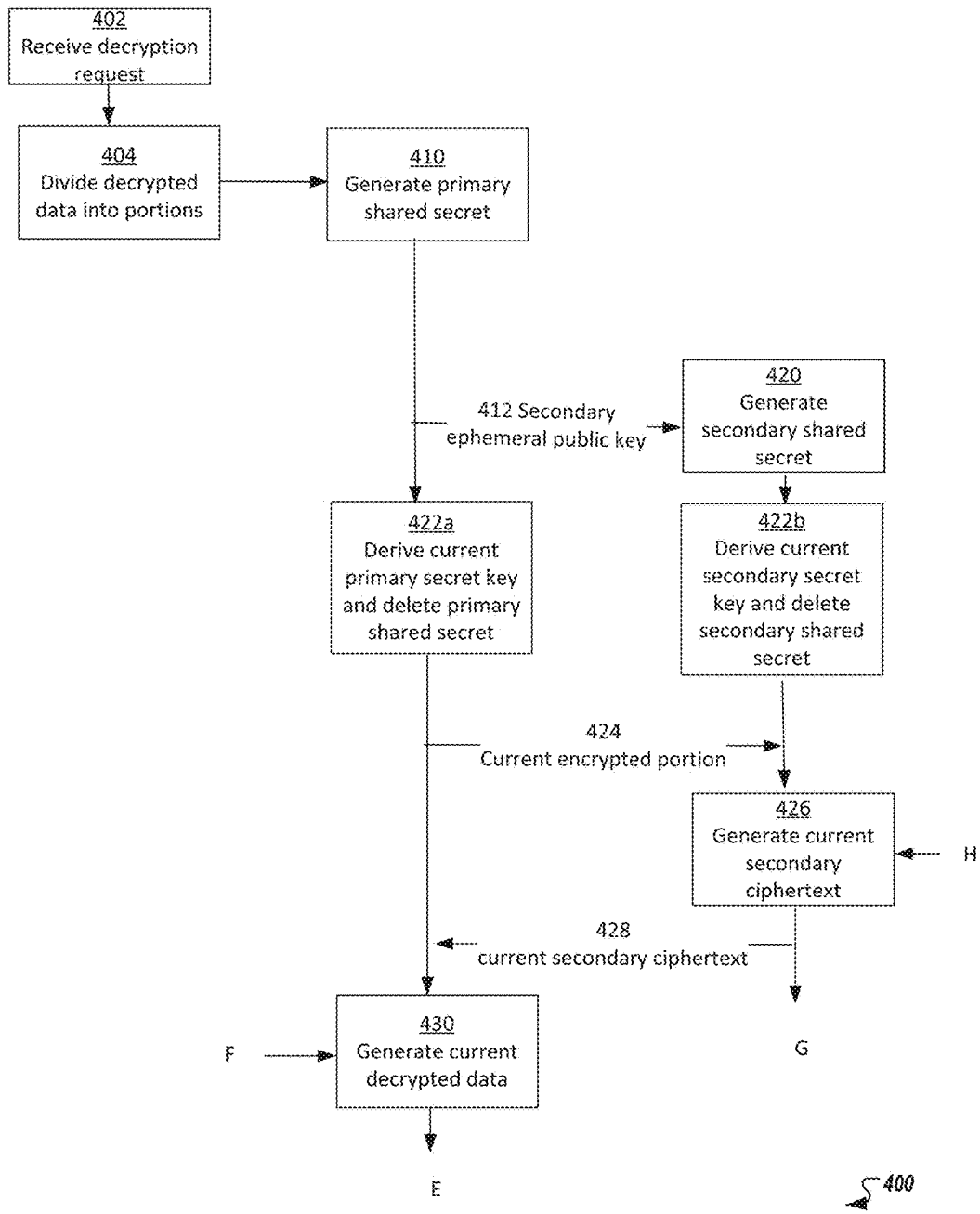
FIGS. 4A and 4B are flow diagrams showing an example process for decrypting data according to an implementation.
Figure 4B:
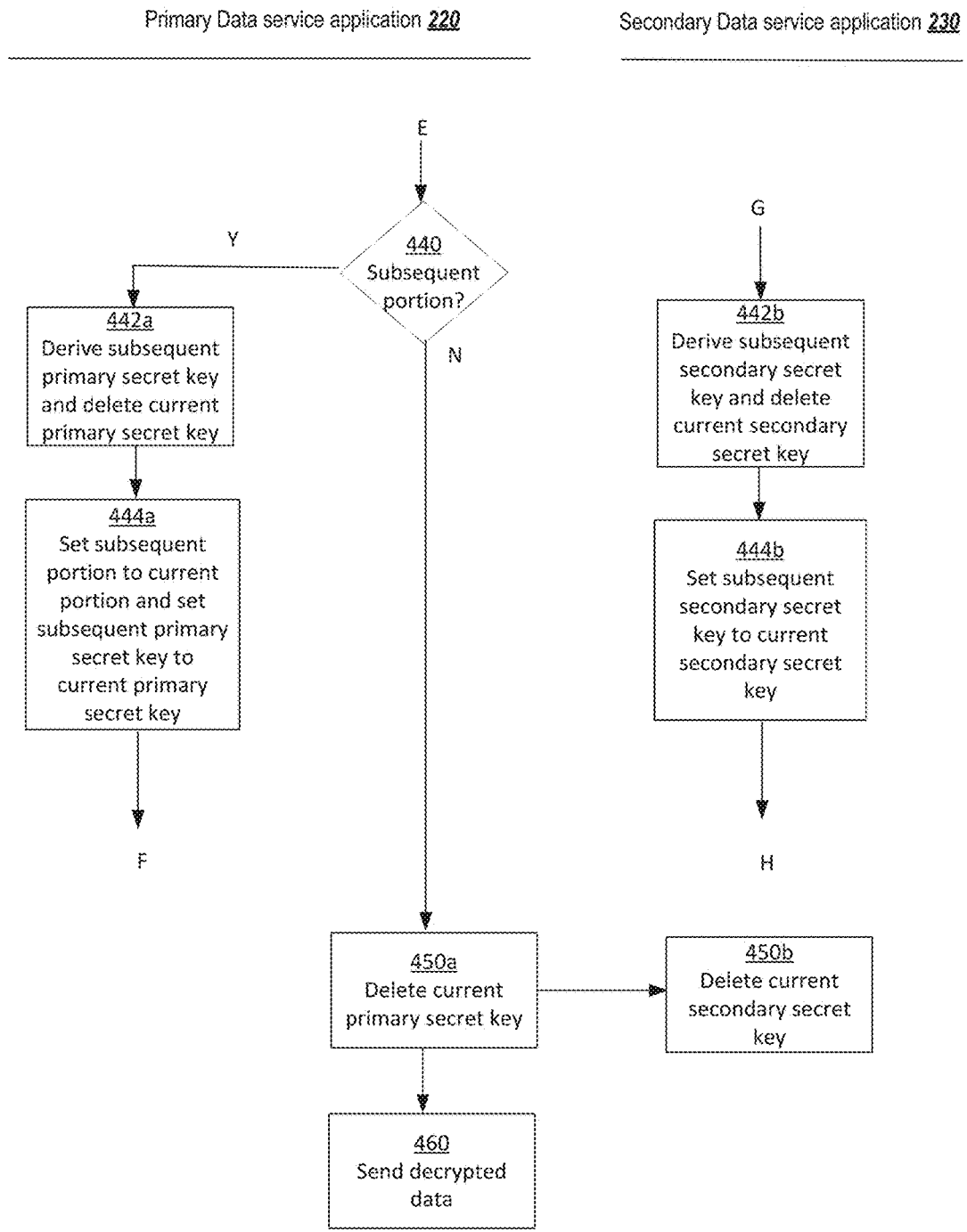

FIG. 4 (including FIGS. 4A and 4B) is a flow diagram showing an example process 400 for decrypting data according to an implementation. The process 400 can be implemented by an electronic device, e.g., the electronic device 102 shown in FIG. 1. The process 400 shown in FIG. 4 can also be implemented using additional, fewer, or different entities. Furthermore, the process 400 shown in FIG. 4 can also be implemented using additional, fewer, or different operations, which can be performed in the order shown or in a different order. In some instances, an operation or a group of the operations can be iterated or repeated, for example, for a specified number of iterations or until a terminating condition is reached.

The example process 400 begins at 402, where a decryption request is received. The decryption request can be received from an application executing on the electronic device. The decryption request can indicate the encrypted data to be decrypted. In some cases, the encrypted data is encrypted by the example process 300 described in FIG. 3. In response to the decryption request, the encrypted data can be retrieved. In some cases, the primary and the secondary ephemeral public keys can also be retrieved. The primary and the secondary ephemeral public keys can be stored with the encrypted data in the same file or in a separate file associated with the encrypted data. In some cases, the decryption request can indicate one or more segments in the encrypted data to be decrypted. For example, an application can request to read a segment of data at one time, and send another request to read the next segment. In some cases, the decryption request can indicate that the decryption is to be performed by both the primary data service application 220 and the secondary data service application 230.

At 404, the encrypted data is divided into working portions. These working portions of the encrypted data can correspond to the working portions of the data used in the encryption process, e.g., at 304 in the example process 300. The first portion of the encrypted data can be set as the current encrypted portion. The current iteration of the decryption process is applied to the current portion of the encrypted data.

At 410, a primary shared secret is derived based on a primary master private key and the primary ephemeral public key received at 402. The primary master private key can be part of a key pair associated with the primary data service application. The key pair can include the primary master private key and the associated primary master public key that is used in the example process 300. The generated primary shared secret can be the same as the primary shared secret generated in the example process 300. The primary ephemeral public key can be deleted after the primary shared secret is generated.

At 412, the secondary ephemeral public key is sent to the secondary data service application 230. At 420, the secondary data service application 230 can use the secondary ephemeral public key and the secondary master private key to derive the secondary shared secret. The secondary master private key can be part of a key pair associated with the secondary data service application. The key pair can include the secondary master private key and the associated secondary master public key that is used in the example process 300.

At 422a, a current primary secret key can be generated based on the primary shared secret. In some cases, a hash, a KDF, or any other cryptographic one-way function can be used to generate the current primary secret key. In some cases, the same cryptographic one-way function that is used in the example process 300 for encrypting the data can be used to generate the current primary secret key for decrypting the data. In some cases, a current primary IV can also be generated based on the primary shared secret. After the current primary secret key is generated, the primary shared secret can be deleted. At 422b, secondary data service application 230 can generate the current secondary secret key and the current secondary IV based on the secondary shared secret. After the current secondary secret key is generated, the secondary shared secret can be deleted.

At 424, the current portion of encrypted data is sent to the secondary data service application 230 for decryption. At 426, the current encrypted portion is decrypted with the current secondary secret key, the current secondary IV, or a combination thereof to generate a current secondary ciphertext.

At 428, the current secondary ciphertext is sent to the primary data service application 220 for another decryption by the primary data service application 220. At 430, the primary data service application 220 decrypts the current secondary ciphertext using the current primary secret key, the current primary IV, or a combination thereof, to generate the current portion of the decrypted data.

At 440, whether the subsequent working portion should be decrypted is determined. As discussed previously, in some cases, the decrypting request can indicate one or more segments to be decrypted. The sizes of the segments can be different from the size of the work portion. Therefore, the segments to be decrypted can include one or more working portions. If the segments include data in one or more subsequent work portions, the subsequent portions can be decrypted as part of an iterative process. At 442a and 442b, subsequent primary and secondary secret keys and subsequent primary and secondary IVs are generated for decrypting the subsequent data portion. The subsequent primary and secondary secret keys and the primary and secondary IVs are generated based on the current primary and secondary secret keys and the current primary and secondary IVs, respectively. In some cases, the current secret key, e.g., the current primary or secondary secret key, is used as input to a KDF to generate the respective subsequent secret key. The current IV, e.g., the current primary or secondary IV, is used as inputs to a KDF to generate the respective subsequent IV. After the subsequent primary and secondary secret keys and the subsequent primary and secondary IVs are generated, the current primary and secondary secret keys and the current primary and secondary IVs can be deleted.

At 444a, the subsequent portion is set to be the current portion, the subsequent primary secret key is set to be the current primary secret key and the subsequent primary IV is set to be the current primary IV. At 444b, the subsequent secondary secret key is set to be the current secondary secret key and the subsequent secondary IV is set to be the current secondary IV. The new current portion is then decrypted as at 426. Any subsequent portions are decrypted in two stage decryption processes as described previously, i.e., at 424, 426, 428, and 430.

If the current working portion is the last portion to be decrypted according to the decryption request, at 450a, the current primary secret key and the current primary IV are deleted. Similarly, at 450b, the current secondary secret key and the current secondary IV are deleted. In some cases, the primary data service application 220 can send a command to the secondary data service application 230 to instruct the secondary data service application 230 to delete the current secondary secret key and the current secondary IV.

At 460, the decrypted data is sent to the application that requests decryption. In some cases, the decrypted data can include one decrypted portion or multiple decrypted portions. In some cases, the decrypted data can include part of one decrypted portion that corresponds to segments indicated in the decryption request.

In some cases, as discussed previously, the key-chaining processes described previously can also be used in an authentication algorithm and one or more authentication tags can be generated. In these or other cases, the authentication tags can be received with the decrypted data at 404 and validated during the decryption process. For example, a current primary authentication key, e.g., a current Message Authentication Code (MAC) key, can be generated based on the primary shared secret. An authentication algorithm, e.g., HMAC, can be applied to the current decrypted portion, using the primary current primary authentication key as an input, to generate an authentication tag. The generated authentication tag can be compared with the authentication tag of the corresponding portion of the data received at 402 to verify data authenticity of the current portion of the data.

In some cases, as described previously, an ephemeral key interval can be configured. When the data is encrypted, a new ephemeral key pair can be generated for each ephemeral key interval. In these cases, during the decrypting process, for each iteration of the current working portion, whether the ephemeral key interval is reached is determined. If the ephemeral key interval is reached and there is remaining data to be decrypted, the process returns to 410, where a new shared secret, e.g., a new primary or secondary shared secret, is generated. A new ephemeral key pair, and subsequently a new current secret key are generated based on the new ephemeral key pair. The process can repeat until the requested segments of data are decrypted.

In some cases, as described previously, more than two data service applications can be used to encrypt data. In these or other cases, these data service applications can also be used to decrypt the data. As in the 2-stage decryption process described previously, the decryption process can be performed in reverse order of the encryption, e.g., the data service application that performs the last stage of encryption can be used to decrypt first, and the decrypted text can be sent to the next data service application for further decryption.

In some cases, a lock event or an unlock event can be detected during the encryption or decryption process. In some cases, the lock event is detected during a decryption or an encryption process of a current portion of the data. A lock event can be triggered by a user interface interaction, e.g., a user can select a user interface object on the electronic device to issue a "lock" command. A lock event can also be triggered by a command sent from an enterprise server associated with the user or the electronic device. In some cases, the lock event can be directed to the electronic device, which transitions all the data on the electronic device into a locked state. Alternatively, the lock event can be directed to a particular partition of resources on the electronic device, which transitions the particular partition of resources into the locked state. For example, resources of the electronic device can be partitioned into multiple logically separated partitions. Each of the logically separated partitions can have a common management scheme that manages the access of the resources in the respective logically separated partitions and prevents access to these resources from other partitions. In one example, a logically separate partition can be configured for enterprise use, and include applications and data associated with an enterprise. A different logically separate partition can be configured for personal use, and include applications and data associated with personal use. The personal partition can include applications and data for personal use of the user.

During a decryption process, when an electronic device or a partition of the electronic device is in a locked state, the data being locked is not accessible by any entities because the master private key is not available. Therefore, when a lock event is detected, the current primary and secondary secret keys and the current primary and secondary cryptographic parameters are deleted from the memory.

In some cases, during the locked state, an unlock event associated with the encrypted data can be detected. An unlock event can be triggered by a user interface interaction, e.g., a user can type a password on the electronic device to issue an "unlock" command. An unlock event can also be triggered by a command sent from an enterprise server associated with the user or the electronic device. An unlock event can be directed to the electronic device or a partition of the electronic device. When an unlock event associated with the encrypted data is detected, the decryption operation of the data can resume.

When an unlock event is detected, the current portion of the data can be determined. In some cases, the current portion of the data can be determined based on the metadata associated with the data. The metadata can indicate information of how the data is encrypted. For example, the metadata can indicate the size of the working portions, the size of data and padding included in each working portion, the ephemeral key interval, or other encryption information. Based on the metadata, the current portion of the data to be encrypted or decrypted can be determined.

In some cases, the primary and the secondary current secret keys and other cryptographic parameters can be encrypted using a context key. In some cases, e.g., in a lock event, the encrypted current secret keys and other cryptographic parameters can be stored while the unencrypted current secret keys and other cryptographic parameters are deleted. The encrypted current secret keys and other cryptographic parameters can be retrieved, decrypted, and used to resume the decryption when an unlock event is subsequently detected. In some cases, the encrypted current secret keys and other cryptographic parameters corresponding to the last portion can be stored. The encrypted current secret keys and other cryptographic parameters can be retrieved, decrypted, and used when decryption on additional segments in the same file is requested. The context key generated based on the master private key. In some cases, the primary and the secondary data service applications can generate different context keys using their respective master private keys.

For a decryption process, the primary and second ephemeral public keys can be used to generate secret keys in succession until the current primary and second secret keys corresponding to the current working portion are generated. The current primary and second secret keys can then be used to decrypt the current working portion as described previously in process 400.

During an encryption process, when an electronic device or a partition of the electronic device is in a locked state, the current primary and secondary secret keys and the current primary and secondary cryptographic parameters can be saved. When an unlock event is detected, the saved primary and secondary secret keys and cryptography parameters can be used to generate the next secret keys and cryptographic parameters, and the encryption process can resume.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A method of encrypting data, the method comprising:
generating, by a primary data service application on an electronic device, a first primary secret key based on a primary ephemeral key pair and a primary master public key;
generating, by the primary data service application, a first primary ciphertext by encrypting a first portion of the data using the first primary secret key;
generating a second primary secret key based on the first primary secret key;
deleting the first primary secret key;
sending the first primary ciphertext from the primary data service application to a secondary data service application;
receiving, by the primary data service application, a first encrypted text from the secondary data service application, wherein the first encrypted text is generated by encrypting the first primary ciphertext;
generating, by the primary data service application, a second primary ciphertext by encrypting a second portion of the data using the second primary secret key;
deleting the second primary secret key;
sending the second primary ciphertext from the primary data service application to the secondary data service application; and
receiving, by the primary data service application, a second encrypted text from the secondary data service application, wherein the second encrypted text is generated by encrypting the second primary ciphertext.

2. The method of claim 1, wherein the primary ephemeral key pair includes a primary ephemeral private key and a corresponding primary ephemeral public key.

3. The method of claim 2, further comprising:
generating a primary shared secret based on the primary master public key and the primary ephemeral private key;
generating the first primary secret key; and
deleting the primary ephemeral private key and the primary shared secret after the first primary secret key is generated.

4. The method of claim 1, further comprising:
prior to deleting the second primary secret key, generating, using a key derivation function, a third primary secret key from the second primary secret key.

5. The method of claim 1, wherein the first encrypted text is generated by encrypting the first primary ciphertext using a first secondary secret key, the second encrypted text is generated by encrypting the second primary ciphertext using a second secondary secret key, and the second secondary secret key is derived from the first secondary secret key.

6. The method of claim 5, further comprising: receiving a secondary ephemeral public key from the secondary data service application, wherein the first secondary secret key is generated based on a secondary ephemeral key pair and a secondary master public key, and the secondary ephemeral key pair includes the secondary ephemeral public key.

7. The method of claim 6, further comprising:
sending a key request from the primary data service application to the secondary data service application; and
wherein the secondary ephemeral public key is received in response to the key request.

8. An electronic device, comprising:
a memory; and
at least one hardware processor communicatively coupled with the memory and configured to:
generate, by a primary data service application on the electronic device, a first primary secret key based on a primary ephemeral key pair and a primary master public key;
generate, by the primary data service application, a first primary ciphertext by encrypting a first portion of data using the first primary secret key;
generate a second primary secret key based on the first primary secret key;
delete the first primary secret key;
send the first primary ciphertext from the primary data service application to a secondary data service application;
receive, by the primary data service application, a first encrypted text from the secondary data service application, wherein the first encrypted text is generated by encrypting the first primary ciphertext;
generate, by the primary data service application, a second primary ciphertext by encrypting a second portion of the data using the second primary secret key;
delete the second primary secret key;
send the second primary ciphertext from the primary data service application to the secondary data service application; and
receive, by the primary data service application, a second encrypted text from the secondary data service application, wherein the second encrypted text is generated by encrypting the second primary ciphertext.

9. The electronic device of claim 8, wherein the primary ephemeral key pair includes a primary ephemeral private key and a corresponding primary ephemeral public key.

10. The electronic device of claim 9, wherein the at least one hardware processor is configured to:
generate a primary shared secret based on the primary master public key and the primary ephemeral private key;
generate the first primary secret key; and
delete the primary ephemeral private key and the primary shared secret after the first primary secret key is generated.

11. The electronic device of claim 8, wherein the at least one hardware processor is configured to:
prior to deleting the second primary secret key, generate, using a key derivation function, a third primary secret key from the second primary secret key.

12. The electronic device of claim 8, wherein the first encrypted text is generated by encrypting the first primary ciphertext using a first secondary secret key, the second encrypted text is generated by encrypting the second primary ciphertext using a second secondary secret key, and the second secondary secret key is derived from the first secondary secret key.

13. The electronic device of claim 12, wherein the at least one hardware processor is configured to: receive a secondary ephemeral public key from the secondary data service application, wherein the first secondary secret key is generated based on a secondary ephemeral key pair and a secondary master public key, and the secondary ephemeral key pair includes the secondary ephemeral public key.

14. The electronic device of claim 13, wherein the at least one hardware processor is configured to: send a key request from the primary data service application to the secondary data service application; and wherein the secondary ephemeral public key is received in response to the key request.

15. A non-transitory computer-readable medium containing instructions which, when executed, cause an electronic device to perform operations comprising:
    generating, by a primary data service application on the electronic device, a first primary secret key based on a primary ephemeral key pair and a primary master public key;
    generating, by the primary data service application, a first primary ciphertext by encrypting a first portion of data using the first primary secret key;
    generating a second primary secret key based on the first primary secret key;
    deleting the first primary secret key;
    sending the first primary ciphertext from the primary data service application to a secondary data service application;
    receiving, by the primary data service application, a first encrypted text from the secondary data service application, wherein the first encrypted text is generated by encrypting the first primary ciphertext;
    generating, by the primary data service application, a second primary ciphertext by encrypting a second portion of the data using the second primary secret key;
    deleting the second primary secret key;
    sending the second primary ciphertext from the primary data service application to the secondary data service application; and
    receiving, by the primary data service application, a second encrypted text from the secondary data service application, wherein the second encrypted text is generated by encrypting the second primary ciphertext.

16. The non-transitory computer-readable medium of claim 15, wherein the primary ephemeral key pair includes a primary ephemeral private key and a corresponding primary ephemeral public key.

17. The non-transitory computer-readable medium of claim 16,
    the operations further comprising:
    generating a primary shared secret based on the primary master public key and the primary ephemeral private key;
    generating the first primary secret key; and
    deleting the primary ephemeral private key and the primary shared secret after the first primary secret key is generated.

18. The non-transitory computer-readable medium of claim 15, the operations further comprising:
    prior to deleting the second primary secret key, generating, using a key derivation function, a third primary secret key from the second primary secret key.

19. The non-transitory computer-readable medium of claim 15, wherein the first encrypted text is generated by encrypting the first primary ciphertext using a first secondary secret key, the second encrypted text is generated by encrypting the second primary ciphertext using a second secondary secret key, and the second secondary secret key is derived from the first secondary secret key.

20. The non-transitory computer-readable medium of claim 19, the operations further comprising: receiving a secondary ephemeral public key from the secondary data service application, wherein the first secondary secret key is generated based on a secondary ephemeral key pair and a secondary master public key, and the secondary ephemeral key pair includes the secondary ephemeral public key.

* * * * *